Figure 1:
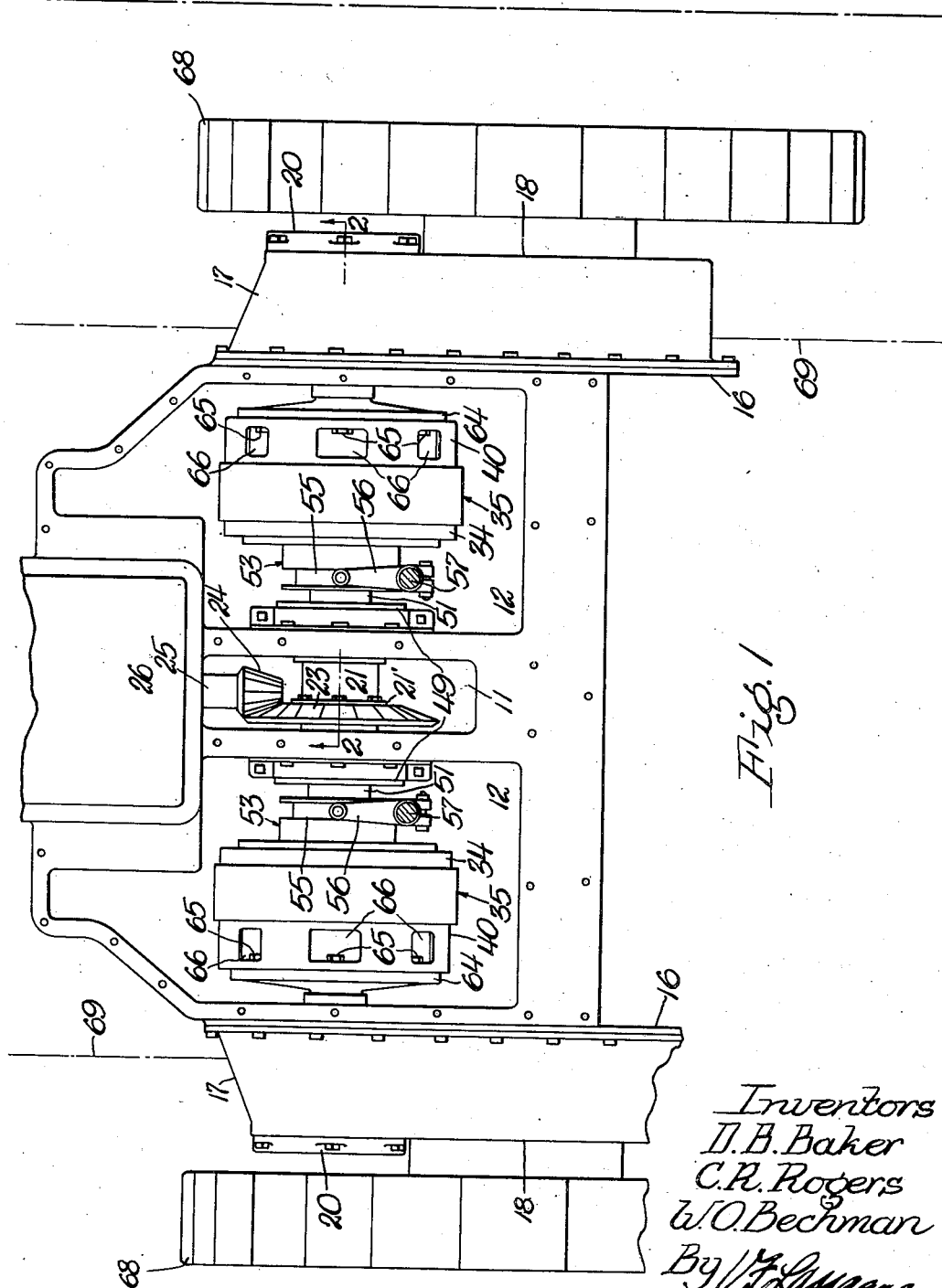

April 16, 1940.　　　D. B. BAKER ET AL　　　2,197,289
TRACK-TYPE TRACTOR
Filed March 18, 1938　　2 Sheets-Sheet 2

Fig. 2

Inventors
D. B. Baker
C. R. Rogers and W. O. Bechman
By V. F. Larraque
Att'y

Patented Apr. 16, 1940

2,197,289

UNITED STATES PATENT OFFICE 2,197,289

TRACK-TYPE TRACTOR

David B. Baker, Riverside, Clifford R. Rogers, Oak Park, and William O. Bechman, Chicago, Ill., assignors to International Harvester Company, a corporation of New Jersey Application March 18, 1938, Serial No. 196,615

10 Claims. (Cl. 180—9.1)

This invention relates to a final drive mechanism assembly for a track-type tractor.

Conventional construction of a tractor of this type includes a crawler track at each side of a central body, and the body includes final drive mechanism for driving a pair of oppositely disposed drive sprockets for driving the crawler tracks. Interposed in this final drive mechanism is a pair of steering clutch units, which may be controlled by the operator for steering the tractor.

In the larger sizes of such tractors, these steering clutches are of the multiple-disk type and are of considerable size and weight. As a consequence, removing the clutches for repairs and service has involved much time and labor. It is desirable, therefore, to provide an assembly which will make the task of removing the said clutches simple, easy, and time-saving without requiring other collateral parts to be disturbed or initially removed, the body or transmission housing having openings in the top thereof through which the clutches may be removed.

In some tractors, the two steering clutches are carried on a common drive shaft, and, in removing the clutches, the whole assembly of shaft and clutches must be removed at the same time. In the structure of the present invention, however, this disassembly and removal of the steering clutches is accomplished in a far simpler and more effective manner, and entirely through the top of the final drive mechanism housing.

In those tractors in which the steering clutch units are mounted on a common shaft, little difficulty is experienced in providing suitable supporting means for the shafts, since portions of the body structure may be utilized for the purpose. Still, it is desirable to provide a final drive construction in which the steering clutch units are readily and individually removable. In these constructions, then, certain difficulties arise concerning the provision of suitable supports for the component parts of the mechanism, and it is important not to sacrifice desirable details of construction for the purpose of providing readily removable clutch units. Accordingly, this invention contemplates the provision of suitable supporting means for those parts of the mechanism subject to the most stresses, such parts including principally the power shafts driven from the tractor transmission and connected to elements of the clutch units. While the construction provided by the invention is designed principally to accommodate changes in structure wrought by the necessity of providing readily removable steering clutch units, it will be found readily and advantageously applicable in other instances.

The principal object of the invention, then, is to provide an improved final drive mechanism assembly for a track-type tractor.

An important object is to provide an improved final drive assembly in which a disconnectable shaft assembly is associated with interposed steering clutches for driving the track chains of the tractor, the shaft parts and the clutch parts being interconnected in a desirable manner to provide suitable bearing supports and drive connections for the parts.

Another object is to provide an arrangement of the steering clutches and a disconnectable shaft assembly in which certain shaft parts are connected to the drive member and journaled in elements of the clutch units.

Another object is to support shaft parts at their ends, to provide a construction that eliminates the use of short-lived outboard or bushing types of bearings.

Briefly and specifically, these and other desirable objects may be achieved as illustrated in one preferred embodiment of the invention, in which a track-type tractor has a body portion formed with a middle and two outer compartments in transverse alinement. The two outer compartments are open at their tops for permitting easy removal therethrough of a pair of steering clutch units located respectively therein. The middle compartment journals a drive member, each side of which is removably connected to and for rotation with a power shaft. The other end of the power shaft is journaled in the driven element of the respective clutch unit. In axial alinement with the drive member and the power shaft there is disposed at each side of the tractor a stub shaft connected to the respective clutch unit for rotation therewith. These stub shafts are associated in driving relation with oppositely disposed drive gearing units for driving the track or crawler chains. In this manner, then, an axially alined disconnectable shaft assembly extends transversely across the compartments and has the steering clutch units interposed therein in a desirable manner providing suitable supports for component parts and permitting individual removal of the steering clutches.

A more complete understanding of the objects and features of the invention may be had from the following detailed description taken in conjunction with the accompanying sheets of drawings, in which:

Figure 1 is a plan view of the rear body portion of a track-type tractor with the rear cover plate removed to show more clearly the disposition of the final drive mechanism and the compartments formed in the body; and, Figure 2 is an enlarged, vertical sectional view of one side of the tractor taken substantially on the line 2—2 of Figure 1.

In the type of tractor selected for illustration for the purposes of the present invention, a rear body portion 10 is formed with a middle compartment 11 and a pair of outer compartments 12 disposed, respectively, at each side of the middle compartment. A pair of comparatively closely spaced vertical walls 13 in the body 10 separates the middle compartment 11 from the outer compartments 12. Each side of the body portion is provided with a vertical end wall 14, which substantially encloses the outer side of an outer compartment 12. A removable cover 15, as shown in Figure 2, encloses the top of the compartments. The body portion 10 also carries at each side a plate member 16, to which is secured a housing 17 for containing track chain drive gearing to be described later. An outer wall 18 of the housing 17 is provided with an opening 19 covered by a cap 20, all of which will be later referred to more in detail.

Since both sides of the tractor are substantially identical, only one side will be described in detail. A disconnectable shaft assembly is disposed transversely across the compartments 11 and 12 and extends into each drive gear housing 17. A central shaft part, or drive member, 21 is rotatably carried in a pair of transversely spaced antifriction bearings 22 carried in the walls 13. This drive member may be in the form of a sleeve provided with a radially outwardly extending annular flange 21', to which is secured for rotation therewith a bevel ring-gear 23. This ring-gear 23 is in mesh with a bevel pinion 24 carried on a shaft 25, driven by a transmission mechanism, not shown, disposed forwardly of the compartment 11 and enclosed in a housing portion, as at 26.

Opposite end portions of the drive member 21 are provided with internal clutch teeth, as at 27. A coupling or shaft part 28, provided with external clutch teeth, is fitted into each end of the drive member 21, the external clutch teeth on the coupling 28 mating in driving engagement with the internal teeth 27 on the drive member 21. This coupling member is preferably hollow and is provided with internal splines, as at 29, and an external, annular flange 30, which may be securely bolted to the drive member 21 by a circle of bolts 31. These bolts 31 prevent relative axial displacement of the parts 21 and 28. It will be noted that the drive member 21 lies substantially wholly within the middle compartment 11, and that the coupling part 28 projects axially into the outer compartment 12. It will also be noted that the junction between the two parts, whereat the bolts 31 secure the two parts together, is located substantially in the outer plane of the wall 13 for a purpose which will appear later.

The shaft assembly also includes an intermediate or power shaft 32 provided at its inner end with a splined portion which engages the internal spline 29 of the coupling member 28 for connecting the shaft parts 21 and 32 for conjoint rotation. It will be noted that the inner end of the shaft 32 terminates outwardly of the outer surface of the wall 13. The power shaft 32 extends axially across the compartment 12, and its outer end terminates within the compartment. Adjacent this outer end of the shaft 32, a splined portion 33 is provided, to which is connected for rotation therewith a driving element 34 of a steering clutch unit 35. The outer end of the shaft 32 is reduced and threaded, as at 36, being still further reduced, as at 37. The reduced end portion 37 of the shaft is journaled or piloted in a pilot bearing 38 carried in a recess 39 of a complementary driven element 40 of the steering clutch unit.

The steering clutch unit is of the multiple-disk type, each element of the clutch carrying a plurality of clutch disks 41. An annular member 42 surrounds a hub portion 43 of the driving member 34 and is provided with an inwardly projecting radial face 44. The hub portion 43 of the driving element 34 is provided with an axially extending annular recess in which a coil spring 45 is disposed. Opposite ends of the coil spring abut the annular radial face 44 on the member 42 and the inner end of the annular recess formed in the member 34. The coil spring 45 provides for maintaining the driving and driven elements in driving engagement through the medium of a plurality of axially outwardly extending portions 46 formed integrally with the member 42 and projecting past the hub member 43 in radially spaced relation with respect thereto through openings 47 formed in a radial face of the driving element 34. The outer ends of the portions 46 are rigidly secured by bolts 48 to an outer radial face of the driven element 40. In this manner the clutch disks 41 are compressed between the outer annular portions of the clutch elements to establish the clutch unit in driving relation with respect to the power shaft 32.

An annular ring member 49 is rigidly carried at the outer face of the wall 13, being secured thereto by a circle of bolts 50. This ring is preferably formed in two halves for easy removal, and serves to aid in preventing axial displacement of the antifriction bearing 22. A sleeve member 51 surrounds the shaft 32 in spaced relation with respect thereto and is provided with an annular flange 52 which is rigidly secured to or carried by the ring member 49. This sleeve member 51 extends axially between the wall 13 and the clutch unit and serves to journal thereon a throw-out bearing assembly 53. This assembly includes an anti-friction bearing 54 abutted at its inner radial face by a grooved ring 55 and at its outer face by the annular radial portion 44 of the member 42. A throw-out control member or fork 56 is rigidly carried at one end on a control shaft 57, which may be suitably connected to operating controls, not shown. The opposite bifurcated ends of the fork 56 are provided with rollers 58, which engage the annular groove in the member 55. By rotating the shaft 57 in a manner causing axial outward movement of the throw-out assembly 53, the coil spring 45 is compressed and the driving and driven elements 34 and 40, respectively, of the clutch are disengaged from driving relation.

As previously mentioned, the outer side of the body portion 10 carries a plate 16, which is rigidly secured to the end wall 14 over an opening 59 formed therein coaxially with respect to the component parts of the disconnectable drive shaft assembly. The plate 16 is also provided with a coaxial opening, in which is carried an anti-friction bearing 60. The outer wall 18, as previously mentioned, is provided with the opening 19, into which is fitted an antifriction bearing 61. These two bearings 60 and 61 are axially alined and are of substantially the same size, supporting therebetween a stub shaft part 62, which is associated with the disconnectable shaft assembly. A drive pinion gear 63 is splined to the shaft 62 for rotation therewith intermediate the antifriction bearings 60 and 61. The inner end of the shaft 62 extends inwardly within the compartment 12 and is provided with a radial flange portion 64, preferably formed as a disk. Bolts 65 removably secure the disk 64 to the outermost radial face of the driven element 40 of the steering clutch unit 35. The periphery of the member 40 is provided with a plurality of circumferentially spaced openings 66, through which access may be had to the bolts 65 for removing the same to remove the clutch unit from the compartment 12. The manner of removing the clutch units will later be more fully described.

Interposed between the plate member 16 and the outer wall 18 of the housing 17, is enclosed a ball gear 67, which is constantly in mesh with the pinion 63. The gears 63 and 67 constitute the track chain drive gearing hereinbefore referred to, and the gear 67 is associated in driving relation, in any suitable manner, with the drive sprocket wheel 68.

It will be understood that there is a housing 17 enclosing drive gearing at opposite sides of the body portion 10, and each sprocket wheel 68 drives a crawler track chain of any well known type, as illustrated diagrammatically at 69 in Figure 1. From the above description, then, it will be apparent that an improved final drive mechanism has been provided for driving the opposite crawler track chains of a track-type tractor. This improved mechanism includes the disconnectable shaft assembly and the component parts thereof in conjunction with the steering clutch units disposed in driving relation with the opposite track chain drive gearing units. This construction embodies desirable features of removal and assembly, which will presently be described in detail.

An important feature of the present invention is to provide a construction that eliminates the handling of cumbersome parts before the clutch units can be removed. In earlier constructions, a large amount of preliminary work had to be performed outside of the body portion before work on the clutch units could be begun. As is illustrated diagrammatically in Figure 1, it will be noted that the inner edge of the crawler track chain overlies a considerable portion of the drive gearing housing. This design is conventional in most tractors of the track type. Since numerous parts had to be removed through the outer wall of the drive gearing housing, portions of the upper run of the track chain had to be dismantled in order to provide sufficient room for a service man to work. Also, the drive sprocket wheel was immediately adjacent the drive gearing housing, and, before a power shaft could be removed axially, it was necessary to aline one of the openings between the spokes of the sprocket wheel with an opening in the drive gearing housing, such as, for instance, the opening 19 in the present disclosure. However, these disadvantages are eliminated in the improved construction provided by the present invention, since all operations may be performed within the compartments 12.

Later constructions attempted to alleviate this dismantling problem by providing a structure separable from the drive gearing structure within the body compartments. However, these constructions were at fault in sacrificing suitable supports for the component parts of the drive units, such as bearings for the power shafts.

As will be appreciated from the foregoing description of the present invention, a construction is provided in which component parts of the final drive mechanism are suitably supported and at the same time the feature of clutch unit removal is enhanced. To remove a clutch unit from a compartment 12, the bolts 50 are removed from the ring 49 and the housing wall 13. The ring 49, together with the sleeve member 51, is moved axially toward the outer end of the power shaft 32. This movement provides access to the bolts 31, which may then be removed from the drive member 21. Since the ring member 49 is preferably formed of two halves, it may be removed from the flanged portion 52 of the sleeved member 51 to further facilitate disassembly. In a preferable operation, the bolts 65, which are readily accessible through the openings 66 in the driven element 40 of the clutch unit 35, are removed from the flanged member 64 of the drive gearing stub shaft 62. The coupling member 28 is then moved axially along the splined portion of the shaft 32 toward the outer end thereof. This movement disengages the teeth portion of the member 28 from the teeth portion 27 of the drive member 21. With the coupling member 28 and the ring and sleeve member 51 in their outermost axial position, and, since the power shaft 32 lies entirely within the compartment 12, the entire unit may be lifted bodily from the compartment upwardly through the opening 12 therein. In short, the unit is separated at its outer face at the junction between the parts 40 and 64, and at its inner face at the junction between the coupling member 28 and the drive member 21.

In earlier constructions, as previously mentioned, a power shaft extended entirely through the body portion from the central part thereof into the drive gearing housing at the outer side thereof, and suitable bearing supports were located in the body or housing portions. Because of this construction, however, it was necessary to remove the power shaft axially outwardly through an opening provided in the outer wall of the drive gearing housing. This resulted in a considerable expenditure of time and effort because of the circumstances hereinbefore referred to. In later constructions, in which provision was made for removing the entire unit from within the body compartment, no adequate supports were provided for the outer end of the power shaft. In these latter constructions, a sleeve member, which in the present invention is replaced by the light weight sleeve member 51, was formed as a comparatively heavy part and extended axially outwardly for some distance, being provided with a bushing for supporting the power shaft; however, this type of support is merely an outboard bearing, and it made no provision for properly supporting the outer end of the shaft. Because of the heavy usage to which the clutch unit was subjected, the power shaft was subjected to resultant stresses and strains. One reason for providing such a type of bearing was because the power shaft had to be moved axially outwardly from its connection with the central drive member. Because of this design, it was impossible to support the outer end of the shaft in a proper manner.

This disadvantage is eliminated by the present construction because of the provision of the axially movable coupling member or shaft part 28, which extends axially inwardly toward the drive member 21 and axially outwardly toward the power shaft 32. This feature eliminates the necessity for moving the shaft 32 axially in either direction, and it is found that a pilot or journal bearing 60 is thereby permitted to be located in the driven element of the clutch unit 35. Thus, it will be appreciated that the numerous features of the construction provided by the present invention permit quick and easy removal of the steering clutches by the simple disconnection of a few parts.

In one desirable construction, the sleeve member 51 may be entirely dispensed with and the throw-out bearing assembly 53 may be supported directly on the shaft 32. This design, however, would entail some differences in construction of the shaft 32 and is recited merely for the purpose of illustrating one of the many advantages of the improved construction.

It will also be appreciated that numerous other modifications and alterations may be made in the present design without departing from the spirit and scope of the present invention as defined in the appended claims.

What is claimed is:

1. A final drive mechanism comprising a housing having a bottom, an end wall and an inner wall spaced from the end wall, said walls providing an open-top compartment therebetween, said walls being provided with axially alined openings, a shaft journaled in the opening in the inner wall, a member removably connected to said shaft for rotation therewith and extending axially into the compartment, an axially alined second shaft removably connected at one end to the member for rotation therewith, said end of the second shaft terminating substantially within the compartment, a third shaft journaled in the opening in the end wall and including a flanged portion at its inner end, a clutch unit comprising driving and driven elements located in the compartment, said driven element being removably secured to the flanged portion on the third shaft, the driving element being secured to the second shaft, the driven element including a portion formed with an axial recess, and a pilot bearing carried in the recess, said pilot bearing journaling the other end of the second shaft in the driven element.

2. A final drive mechanism comprising a housing having a bottom, an end wall and an inner wall spaced from the end wall, said walls providing an open-top compartment therebetween, said walls being provided with axially alined openings, a shaft journaled in the opening in the inner wall, an axially alined internally splined sleeve member removably connected to said shaft and extending into the compartment, an axially alined second shaft having a splined inner end removably splined to the sleeve member, said splined end terminating substantially within the compartment, a third shaft journaled in the opening in the end wall and including a flanged portion at its inner end, a clutch unit comprising driving and driven elements located in the compartment, said driven element being removably secured to the flanged portion on the third shaft, the driving element being secured to the second shaft, said driven element including a portion formed with an axial recess, and a pilot bearing carried in the recess, said pilot bearing journaling the other end of the second shaft in the driven element.

3. A final drive mechanism comprising a housing having a bottom, an end wall and an inner wall spaced from the end wall, said walls providing an open-top compartment therebetween, said walls being provided with axially alined openings, a shaft journaled in the opening in the inner wall, an axially alined internally splined sleeve member removably connected to said shaft and extending into the compartment, an axially alined second shaft having a splined inner end removably splined to the sleeve member, said splined end terminating substantially within the compartment, a third shaft journaled in the opening in the end wall and including a flanged portion at its inner end, and a clutch unit comprising driving and driven elements located in the compartment, said driven element being removably secured to the flanged portion on the third shaft, the driving element being secured to the second shaft.

4. In a track-type tractor having a body portion including a plurality of walls separating the portion into three transversely alined compartments, the two outer compartments being similar and each containing a steering clutch unit, each unit comprising driving and driven elements, a drive member journaled in the walls of the central compartment and having its opposite ends terminating short of the respective outer compartments, a pair of power shafts, one in each outer compartment having its inner end connected to an end of the drive member and intermediate its ends to the driving element of the respective clutch unit, the outer end being journaled in the driven element of said clutch unit, each of said shafts terminating at opposite ends within their respective outer compartments, and a pair of stub shafts journaled in the walls at the outer sides of the body portion in axial alinement with the power shafts and the clutch units, each stub shaft being removably connected to the driven element of a respective clutch unit.

5. In a track-type tractor having a body portion provided with a pair of transversely spaced and alined compartments open at their tops, a pair of steering clutch units located respectively in the compartments, said units being removable from the compartments through the aforesaid open tops, each unit including driving and driven elements, the driven elements being removably connected within the respective compartments to oppositely disposed track drive mechanisms at the sides of the body, a pair of power shafts disposed respectively in transverse axial alinement in the compartments, the inner end of each shaft terminating within the compartment, means disposed between the inner ends of the shafts and interconnecting the same for conjoint rotation, the outer end of each shaft being journaled in the driven element of the respective clutch unit, each intermediate shaft being connected intermediate its ends for rotation with the driving element of the respective clutch unit.

6. In a track-type tractor having a body portion formed with a middle and two outer compartments in substantially transverse alinement, said outer compartments being open at their tops, a final drive mechanism comprising a drive member rotatably journaled in the middle compartment and lying substantially wholly therein, a driving unit and a driven unit located in each outer compartment, each driving unit including a power shaft lying wholly within the respective compartment, said shaft being journaled at its outer end in the driven unit, each driving unit further including a driving part of a steering clutch carried for rotation by and with the respective power shaft, each driven unit including a complementary driven part of a steering clutch and drive means for a respective track chain, and means located in each compartment for connecting the inner end of the respective power shaft to the aforesaid drive member for rotation therewith.

7. In a track-type tractor having a body portion formed with a middle and two outer compartments in transverse alinement and housings at opposite sides of the body portion containing drive gearing for opposite track chains, a final drive mechanism for the drive gearing comprising a shaft assembly including axially alined shaft parts extending transversely across the compartments and into the opposite housings, a shaft part being journaled in the middle compartment and being power driven, a stub shaft part at each end being associated in driving relation with respective drive gearing, a pair of intermediate shaft parts being disposed between the stub shaft parts and the middle shaft part and connected for rotation with said middle part, and a pair of steering clutch units for the drive gearing interposed in the shaft assembly, one located in each outer compartment and each including a driven element connected for rotation with the respective stub shaft and a driving element connected for rotation with the respective intermediate shaft, each intermediate shaft being journaled in the respective driven element.

8. In a tractor of the track-laying type, the combination of a housing including inner and outer spaced vertical walls forming a compartment, said housing having an opening in the top substantially coincidental with the compartment, a drive shaft journaled in the inner wall, a second shaft in axial alinement with the drive shaft and connected thereto for rotation therewith, said second shaft extending axially across the compartment toward and terminating short of the outer wall, said shaft being shorter than the greatest width of the aforesaid opening, a clutch part carried on said shaft intermediate its ends for rotation therewith, a coaxial stub shaft carried by the outer wall, a complementary clutch part removably connected to the stub shaft inwardly of the outer wall and for rotation therewith, the connection between the second clutch part and the stub shaft lying substantially at the outer end of the second shaft, and means journaling the outer end of said second shaft in the second clutch part.

9. In a tractor of the track-laying type, the combination of a housing including inner and outer spaced vertical walls forming a compartment, said housing having an opening in the top substantially coincidental with the compartment, a drive shaft journaled in the inner wall, the outer end of said drive shaft terminating substantially at the outer face of the inner wall, a coupling member removably connected to the drive shaft for rotation therewith and extending axially therefrom toward the outer wall, a second coaxial shaft removably connected to the coupling member for rotation therewith, said shaft extending axially across the compartment toward and terminating short of the outer wall, said shaft being shorter than the greatest width of the aforesaid opening, a clutch part carried on said shaft intermediate its ends for rotation therewith, a coaxial stub shaft carried by the outer wall, a complementary clutch part removably connected to the stub shaft inwardly of the outer wall and for rotation therewith, the connection between the second clutch part and the stub shaft lying substantially at the outer end of the second shaft, and means journaling the outer end of said second shaft in the second clutch part.

10. In combination, a housing having spaced vertical walls, a drive shaft journaled in one wall, a second shaft in axial alinement with the first shaft and extending axially therefrom toward said other wall, a coupling member interconnecting said shafts for conjoint rotation and being axially movable with respect to both, the other end of said shaft terminating short of said other wall, a clutch part carried on said shaft intermediate its ends for rotation therewith, a coaxial stub shaft journaled in said other wall, a complementary clutch part carried by the stub shaft for rotation therewith, said clutch part being located between the walls, and means journaling said other end of the second shaft in said second clutch part.

DAVID B. BAKER.
CLIFFORD R. ROGERS.
WILLIAM O. BECHMAN.